Feb. 22, 1966 W. R. POSTLEWAITE 3,236,302
APPARATUS FOR ATTACHING AND DETACHING A
WORKING BASE TO AN UNDERWATER WELL BASE
Filed Nov. 5, 1962 9 Sheets-Sheet 1

INVENTOR
WILLIAM R. POSTLEWAITE
BY *L E Johnston*
*Edward J Keeling*
ATTORNEYS

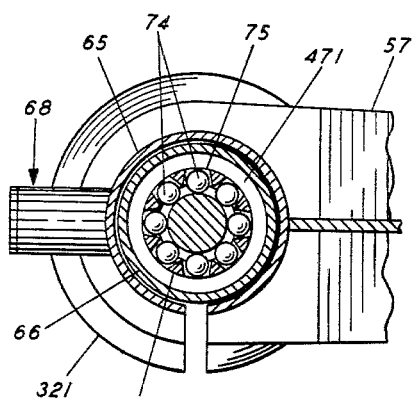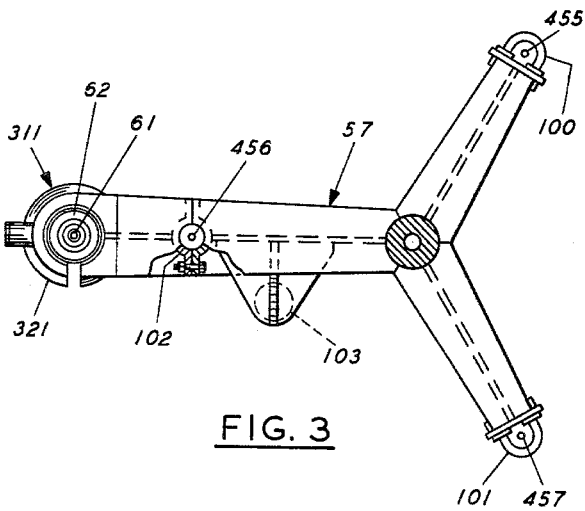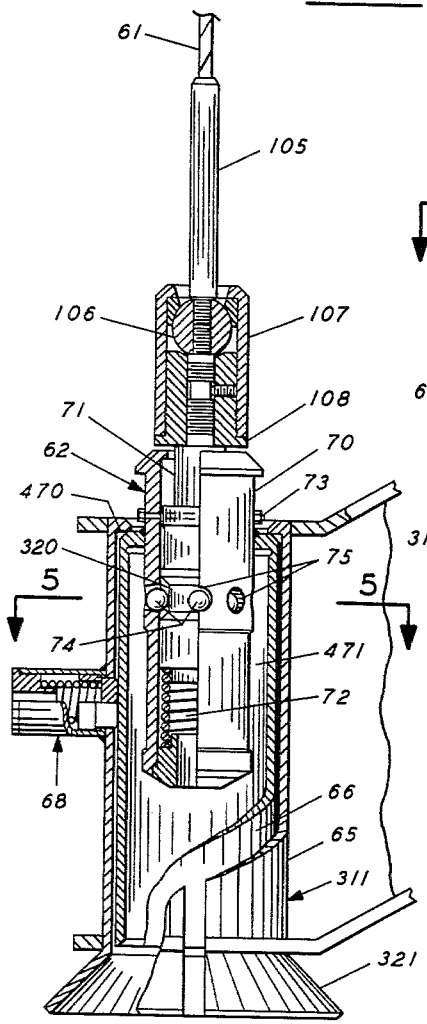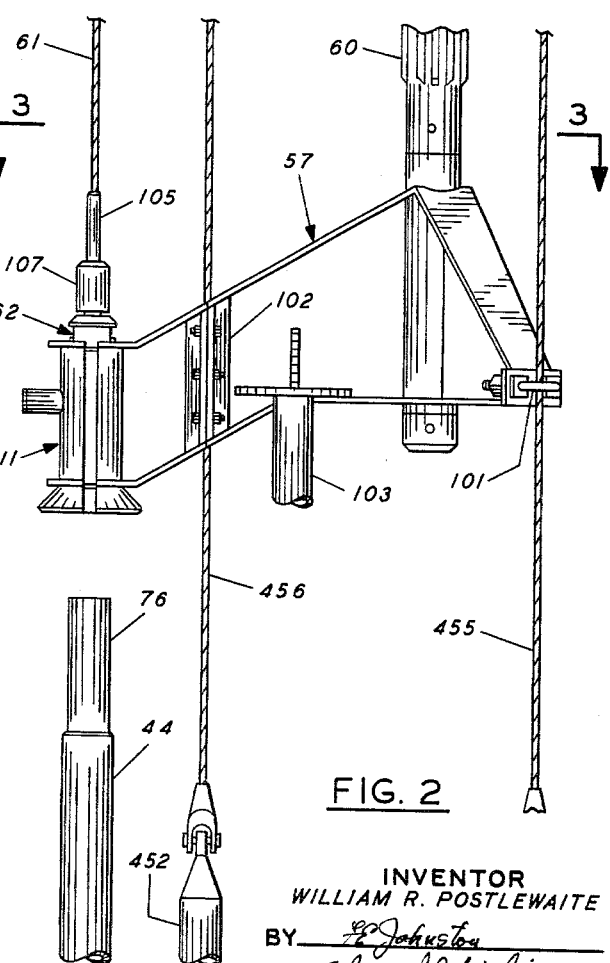

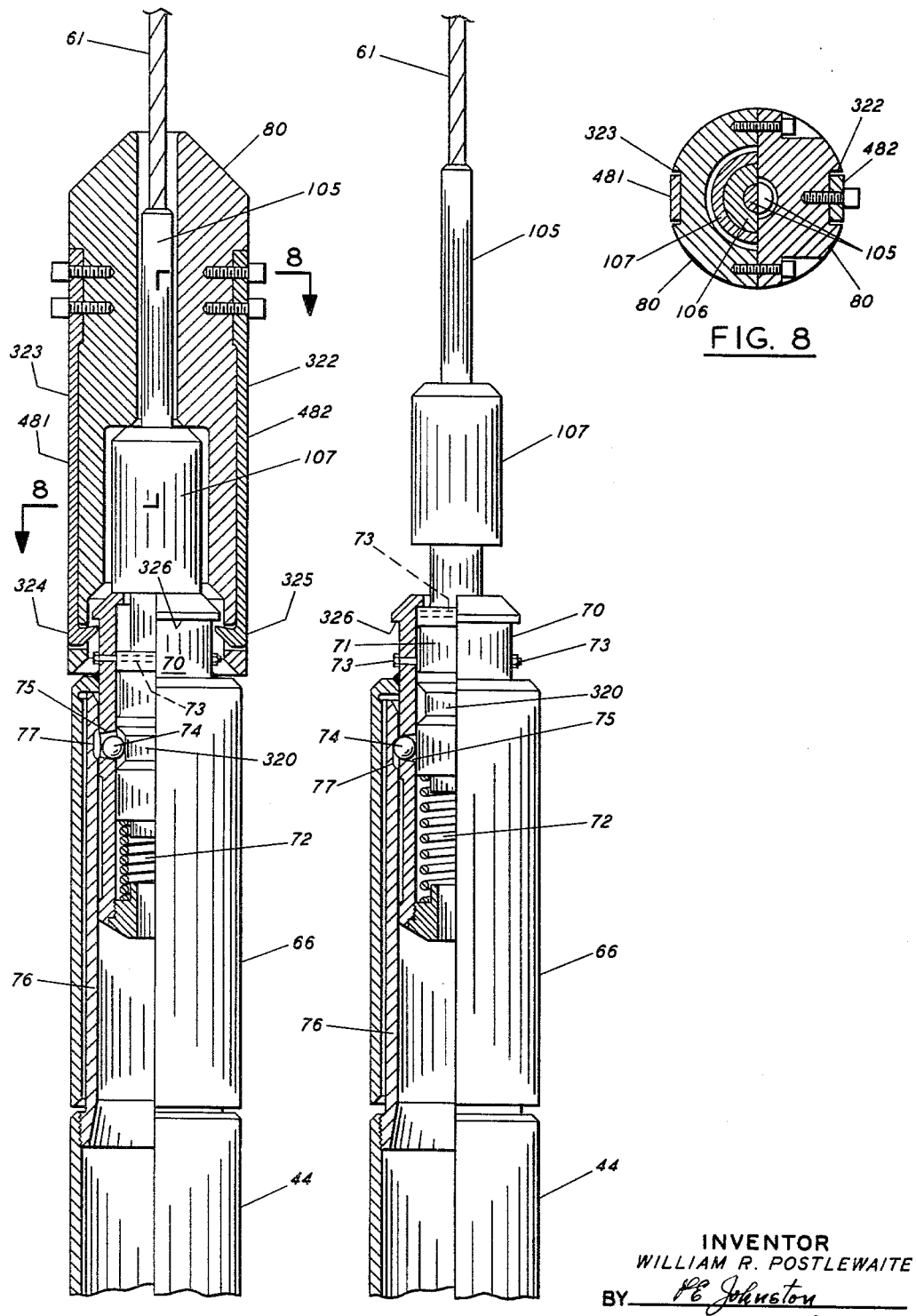

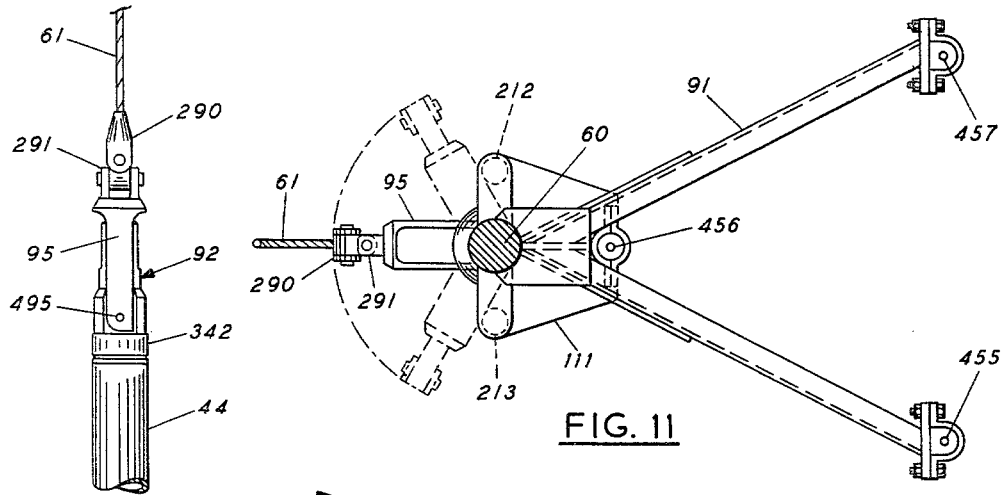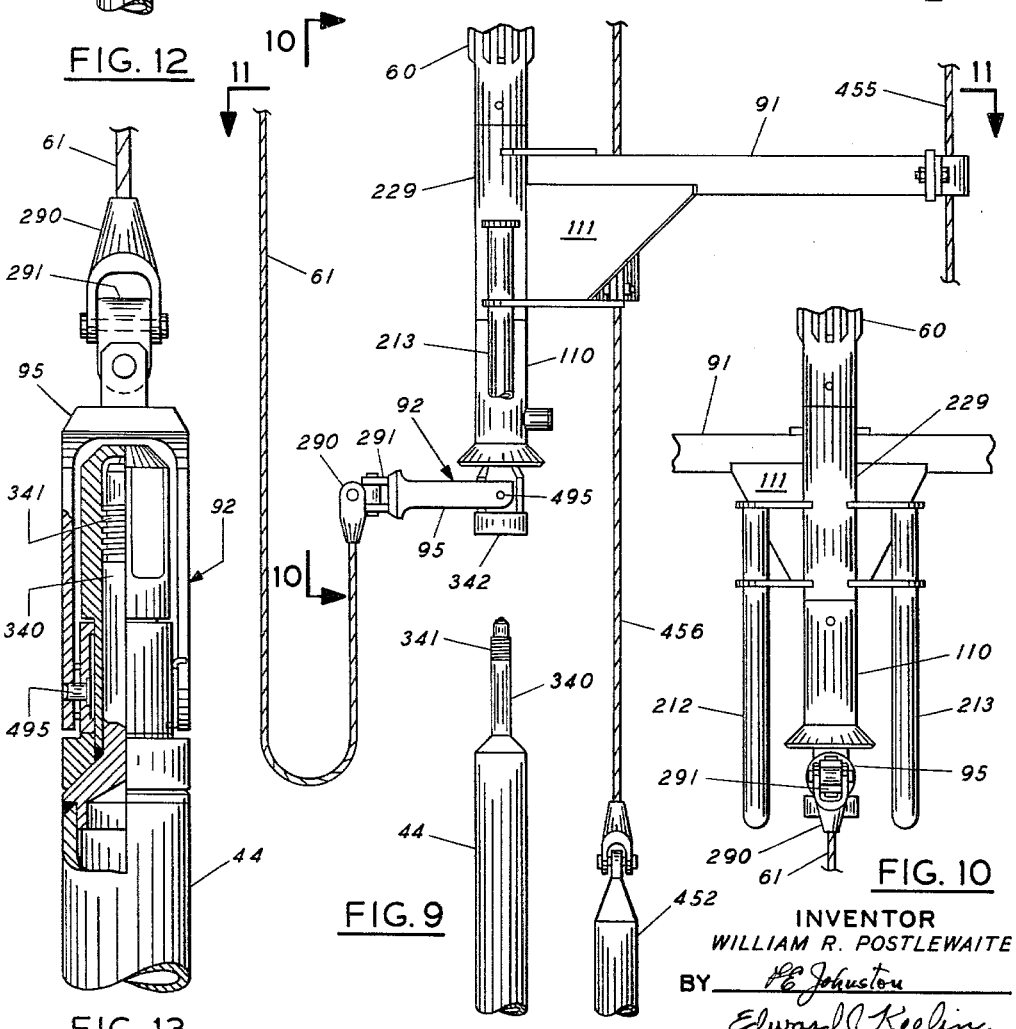

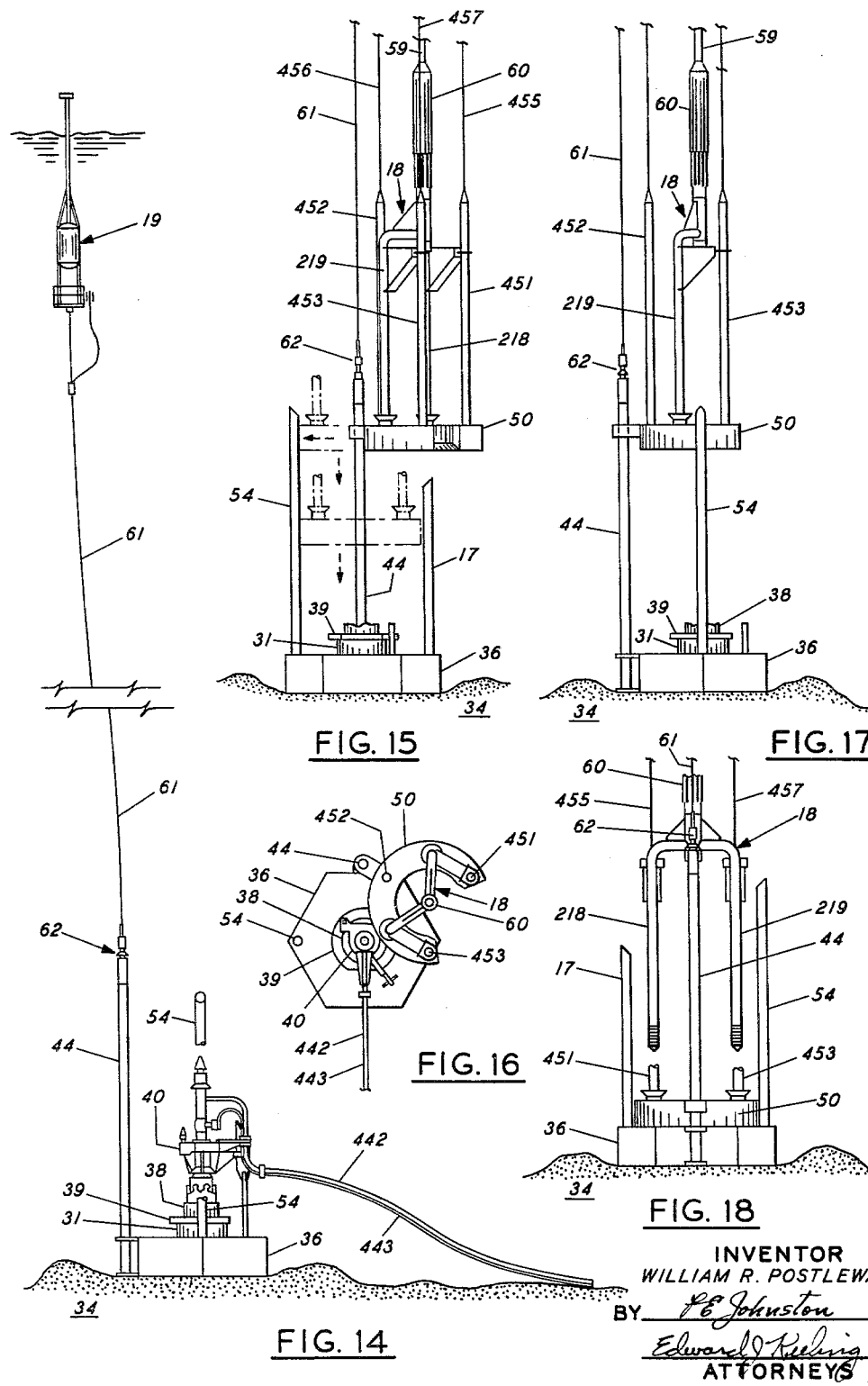

INVENTOR
WILLIAM R. POSTLEWAITE
BY P.E. Johnston
Edward L. Keeling
ATTORNEYS

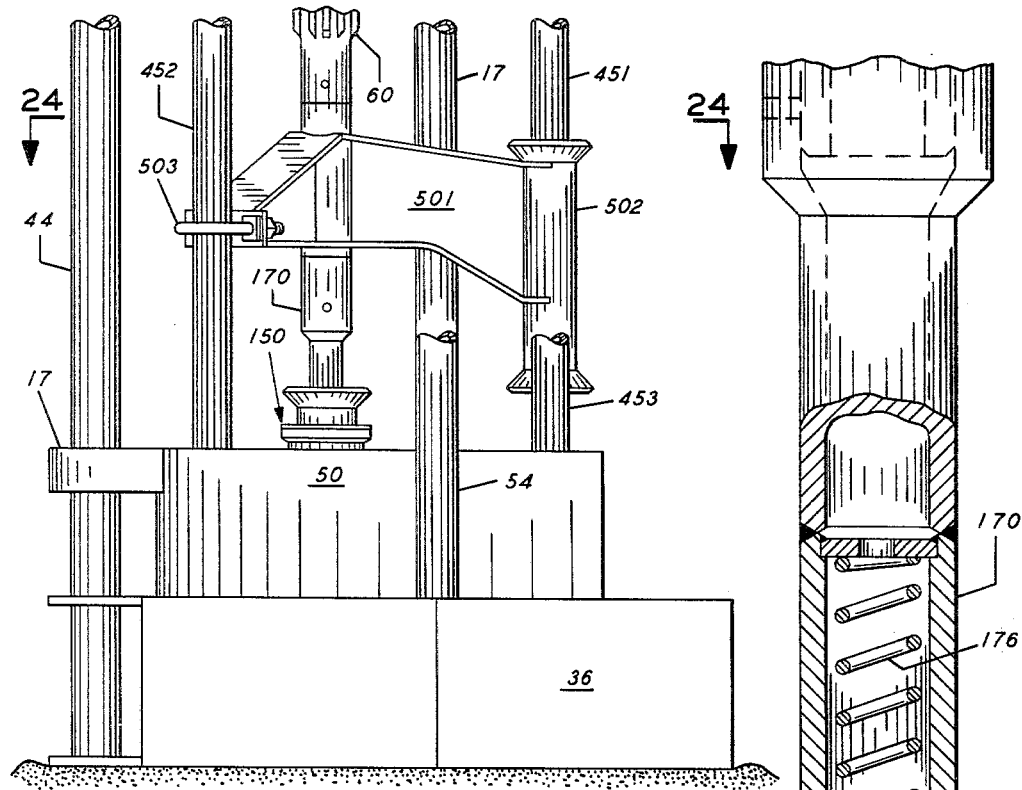
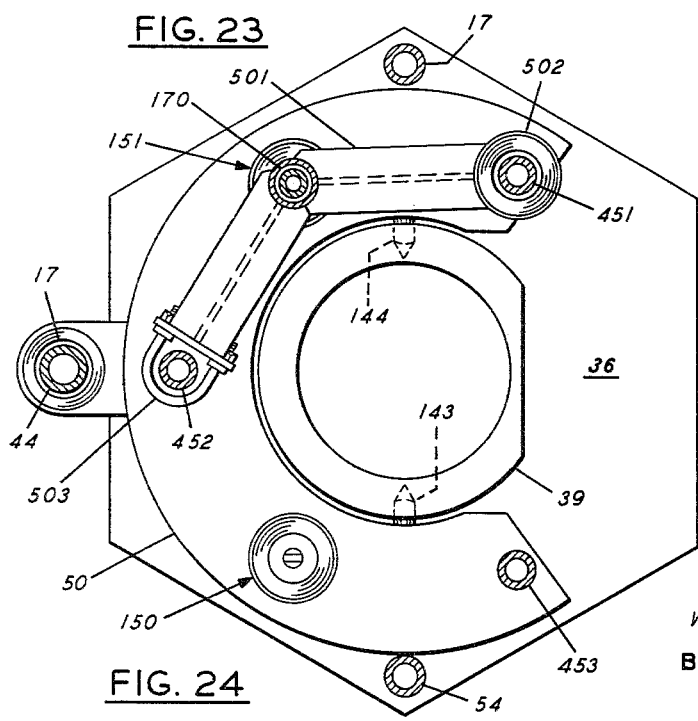
FIG. 23
FIG. 24
FIG. 28
INVENTOR
WILLIAM R. POSTLEWAITE

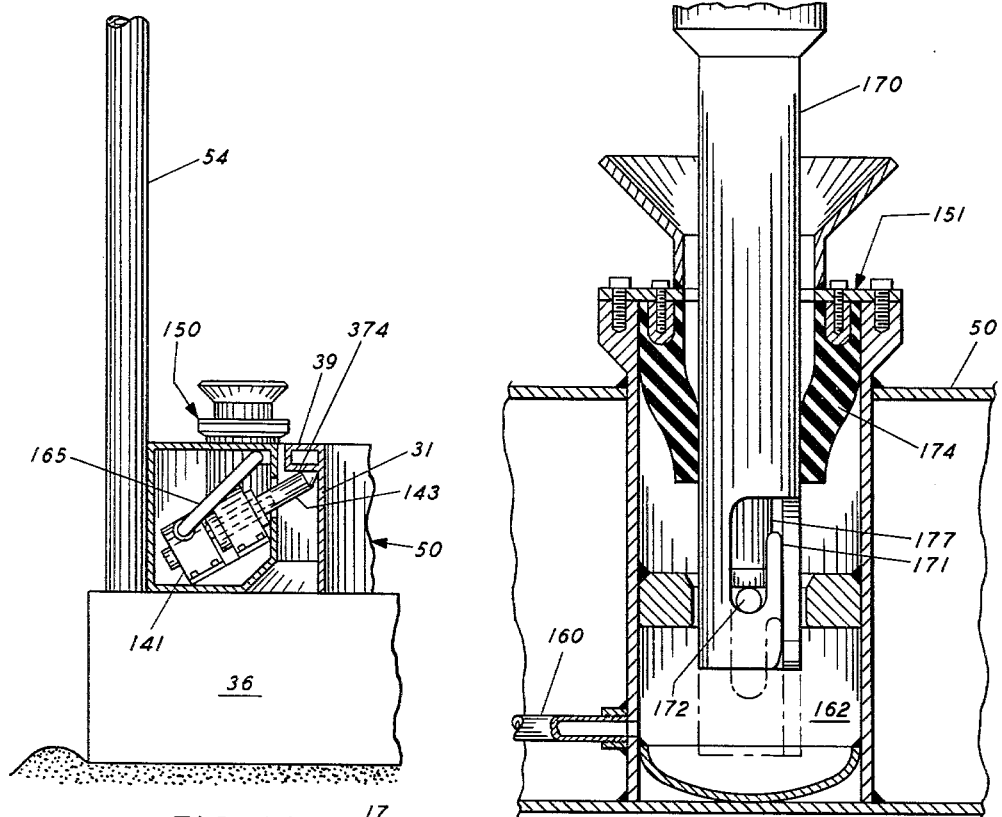
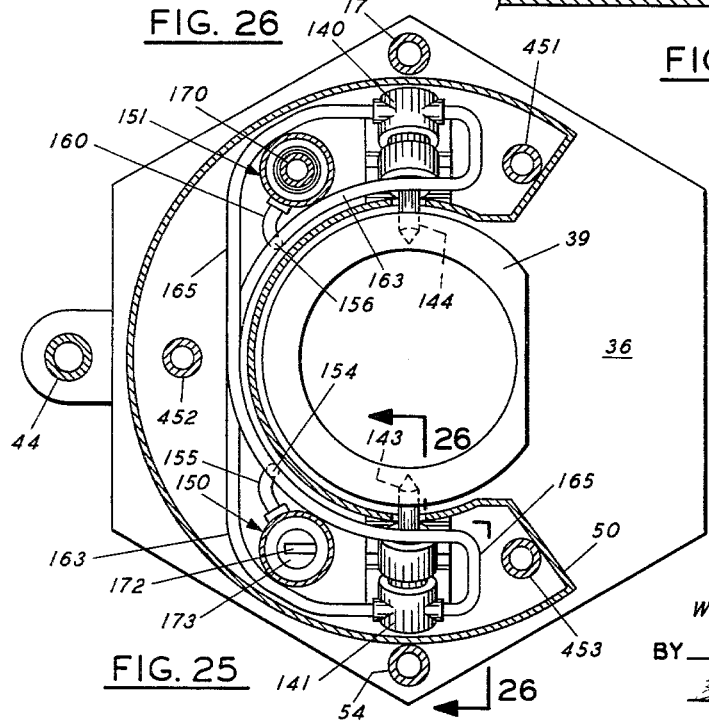

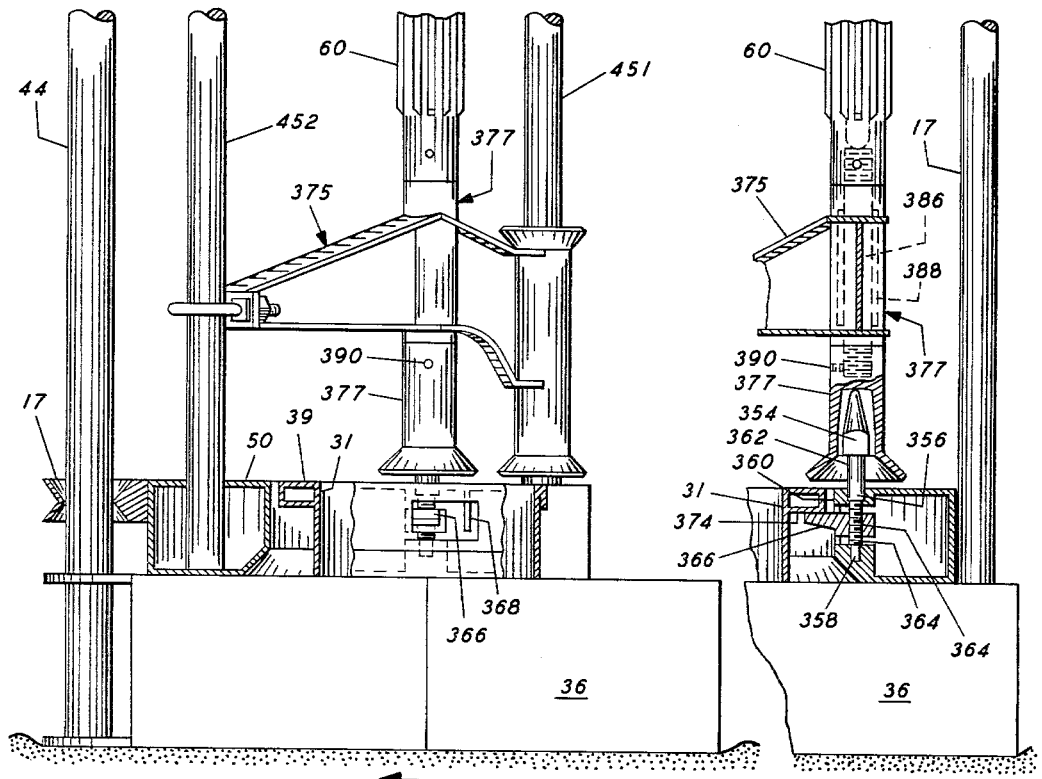
FIG. 30
FIG. 31
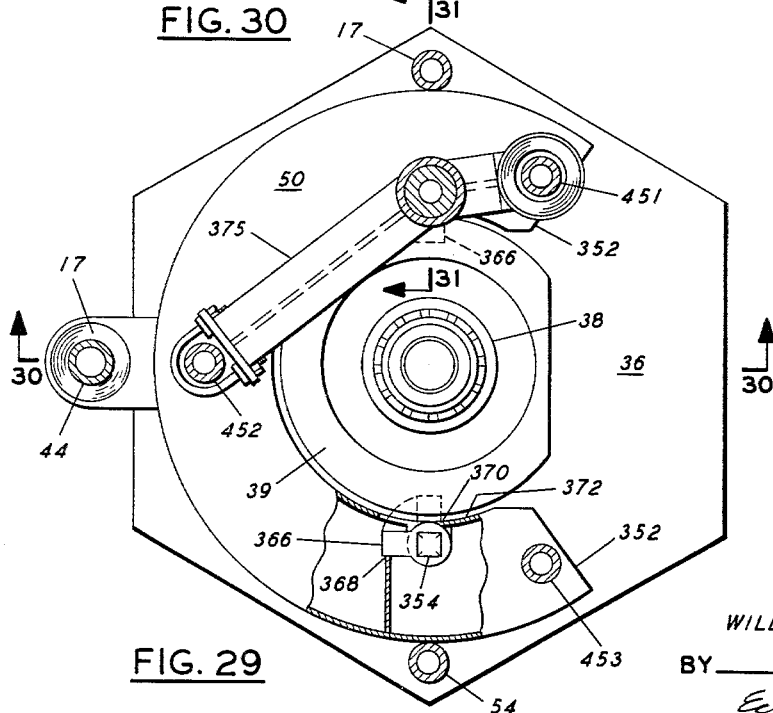
FIG. 29
INVENTOR
WILLIAM R. POSTLEWAITE

United States Patent Office 3,236,302
Patented Feb. 22, 1966

3,236,302
APPARATUS FOR ATTACHING AND DETACHING A WORKING BASE TO AN UNDERWATER WELL BASE
William R. Postlewaite, Menlo Park, Calif., assignor to Chevron Research Company, a corporation of Delaware
Filed Nov. 5, 1962, Ser. No. 235,215
8 Claims. (Cl. 166—.6)

This invention relates to methods and apparatus for working on a submerged well by operations performed on a platform on the surface of the water, and more particularly it relates to methods and apparatus for attaching and detaching without the use of divers a working base including a plurality of guide posts and the guide lines associated therewith to a permanent, submerged base of subsea well by remote control from an operational base located on the platform at the surface of the water.

The art of drilling in water has progressed to a stage where the depth of the water over an oil-bearing formation does not place a practical limitation on drilling into these formations. However, there are needs for methods and apparatus of drilling and well completion which will be certain without the use or aid of divers and which are not too costly to construct and install, and which will not present any undue difficulties or expense in the operation and maintenance of a well.

It is a broad aspect of the invention to provide methods and apparatus for remotely connecting and disconnecting a plurality of spaced apart guide posts including the flexible guide lines associated therewith to and from a permanent base of a subsea well. The invention provides for establishing a flexible pilot line between a permanent base fixedly located under the water and the surface of the water. The flexible pilot line extends, for example, from a pilot post fixedly attached to a permanent base of a subsea wellhead. One end of the flexible pilot line is disconnectably coupled to the guide post of the permanent base of the subsea wellhead. The other end of the flexible pilot line is attached to a buoy or float and is thus held at the surface or near the surface of the water.

A floating platform or vessel having an operational base is positioned on the water's surface in approximate vertical relationship with the fixed permanent subsea base. The floating end of the pilot line is captured and operably connected with the operational base of the vessel. The flexible pilot line provides a flexible connecting element between the operational base and the subsea permanent base. A working base, said base including at least a pair of spaced apart guide posts and the flexible guide lines associated therewith said lines having one end operably attached to each of said posts and the other ends operably connected at said operational base on said vessel, is lowered into the water by a suitable means, such as a drill string and is guided toward the permanent base by means of the flexible pilot line. The guide lines are extended between the operational base of the vessel and the working base as it is lowered into the water.

The working base is guided by the pilot line to a position immediately above the pilot post attached to the permanent base of the subsea well. A portion of the working base is slidably and pivotally engaged on the pilot post. The working base is aligned to a predetermined alignment with the permanent base by suitable means such as torquing by the drill pipe. The aligned working base is then slidably lowered along the pilot post to contact the permanent base.

The working base is disconnectably connected to the subsea permanent base remotely from the surface without the use of divers. The guide posts which are fixedly held in spaced apart relationship by the working base and the guide lines connected between each of the guide posts and the operational base of the vessel are operably positioned in the water and provide a connection between the vessel on the surface and the subsea well site. The pilot line is disconnectably attached to the pilot post, and if desired, the pilot line may be removed after the working base is in place. When the operations at the subsea permanent base and the working base disconnectably connected thereto are completed the flexible pilot line is guided to the pilot post for connection thereto by means of the flexible guide lines extending between the operational base on the vessel to the working base attached to the permanent base. The pilot line is disconnectably connected to the pilot post.

When the pilot line is connected to the pilot post the working base, including the guide posts attached thereto, is disconnected from the permanent subsea base and removed from the permanent base. In this manner a minimum of equipment remains at the underwater well site during periods when it is not connected by guide lines and guide posts to a drilling vessel. However, when it is again desired to do work on the underwater well site, the methods and apparatus of this invention provide for establishing the working base on the well site and connecting the working base with the operational base of a vessel by means of guide lines and guide posts.

It is a particular object of this invention to provide methods and apparatus for attaching and detaching a working base including the guide posts and flexible guide lines associated therewith to a permanent base at an underwater well site said attaching and detaching being accomplished from a surface location without the use of divers.

Further objects and advantages of the present invention will become apparent from the following detailed description read in light of the accompanying drawings which are a part of this specification and in which:

FIG. 2 illustrates, in side elevation, an enlarged view of a portion of the apparatus illustrated in FIG. 1 and better shows one form of apparatus for disconnectably connecting the pilot line to the pilot post;

FIG. 3 is Section 3—3 of FIG. 2;

FIG. 4 is a side elevation partially in section illustrating a coupling member for disconnectably connecting the pilot line to the pilot post;

FIG. 5 is Section 5—5 of FIG. 4;

FIG. 6 is an elevation view partially in section illustrating the coupling member of FIG. 4 disconnectably connecting the pilot line and the pilot post;

FIG. 7 is an elevation view partially in section illustrating a means for disconnecting the coupling member from the pilot post;

FIG. 8 is Section 8—8 of FIG. 7;

FIG. 9 is an elevation view illustrating an alternate coupling member and apparatus associated therewith for disconnectably connecting the pilot line to the pilot post;

FIG. 10 is a side view taken at Section 10—10 of FIG. 9;

FIG. 11 is a sectional view taken at Section 11—11 of FIG. 9;

FIG. 12 is a partial elevation view illustrating the pivotal connection of the alternate coupling member connecting the pilot line to the alternate coupling member and the pilot line;

FIG. 13 is an elevation view partially in section illustrating the alternate coupling member disconnectably connecting the pilot line and the pilot post;

FIG. 14 is a side elevation illustrating apparatus assembled in accordance with this invention and including a pilot line extending from a pilot post on subsea well to the surface of the water;

FIG. 15 is an elevation view illustrating the working base pivotally and slidably connected to the pilot post;

FIG. 16 is a top view of the apparatus appearing in FIG. 15;

FIG. 17 is a side elevation view of the working base after it has been aligned for seating on the permanent base;

FIG. 18 is an elevation view of the working base positioned on the permanent base of the subsea well site;

FIG. 23 is an elevation view illustrating a working base operably positioned in contact with a permanent base;

FIG. 24 is Section 24—24 of FIG. 23;

FIG. 25 is a view similar to FIG. 24 with parts broken away for clarity of presentation and illustrating a means for disconnectably connecting the working base to the permanent base;

FIG. 26 is Section 26—26 of FIG. 25;

FIG. 27 is an elevation view with parts broken away for clarity, illustrating a means for connecting the drill string into the working base to provide a hydraulic conduit from the surface to the working base;

FIG. 28 is an elevation view partially in section of the nozzle end of the drill string;

FIG. 29 is a plan view with parts broken away for clarity of presentation illustrating an alternative means for disconnectably connecting the working base to the permanent base;

FIG. 30 is Section 30—30 of FIG. 29; and

FIG. 31 is Section 31—31 of FIG. 29.

Figure 1:
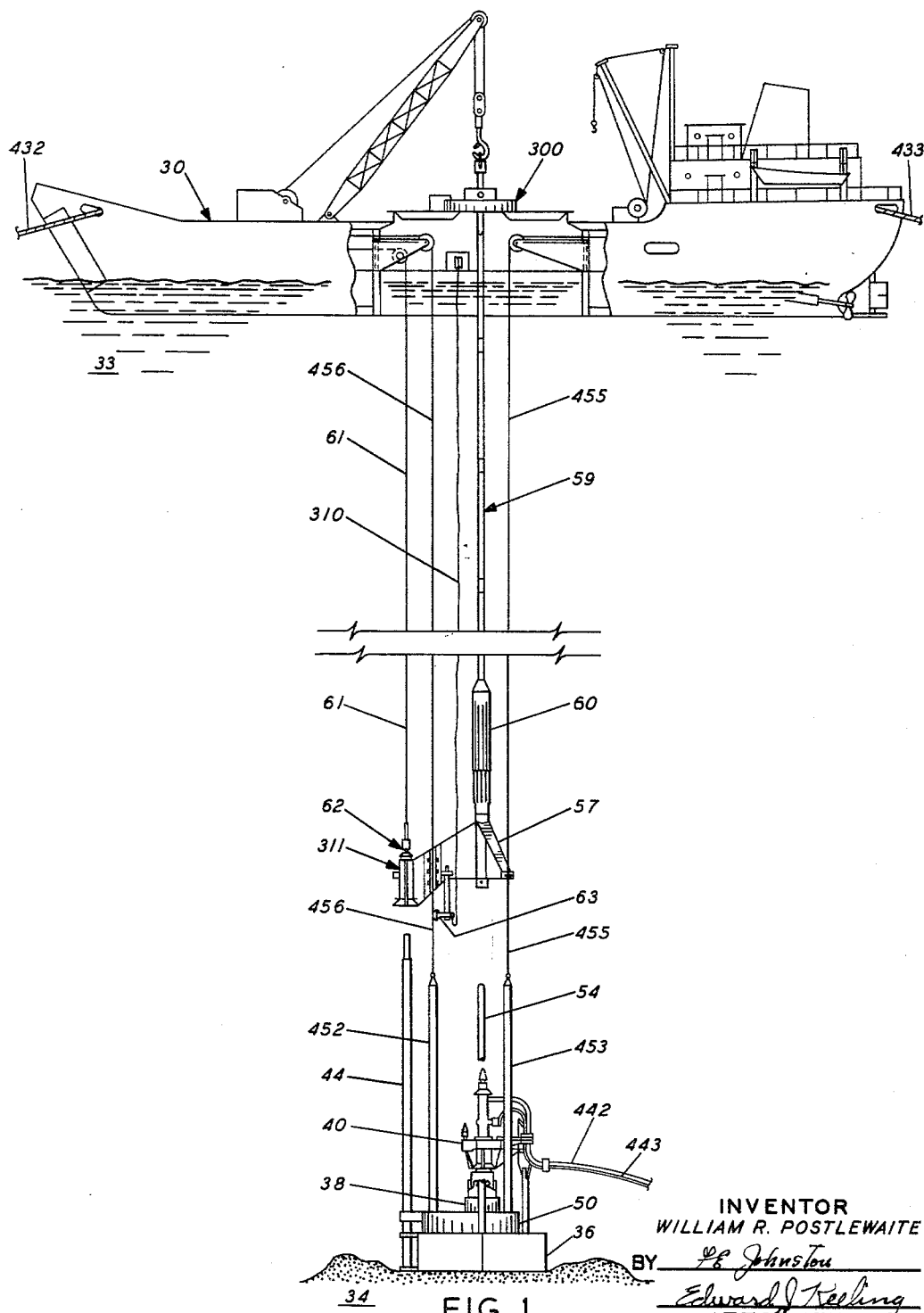
FIG. 1 illustrates, in side elevation with parts broken away for clarity of presentation, apparatus assembled in accordance with this invention.
Figures 21, 22:
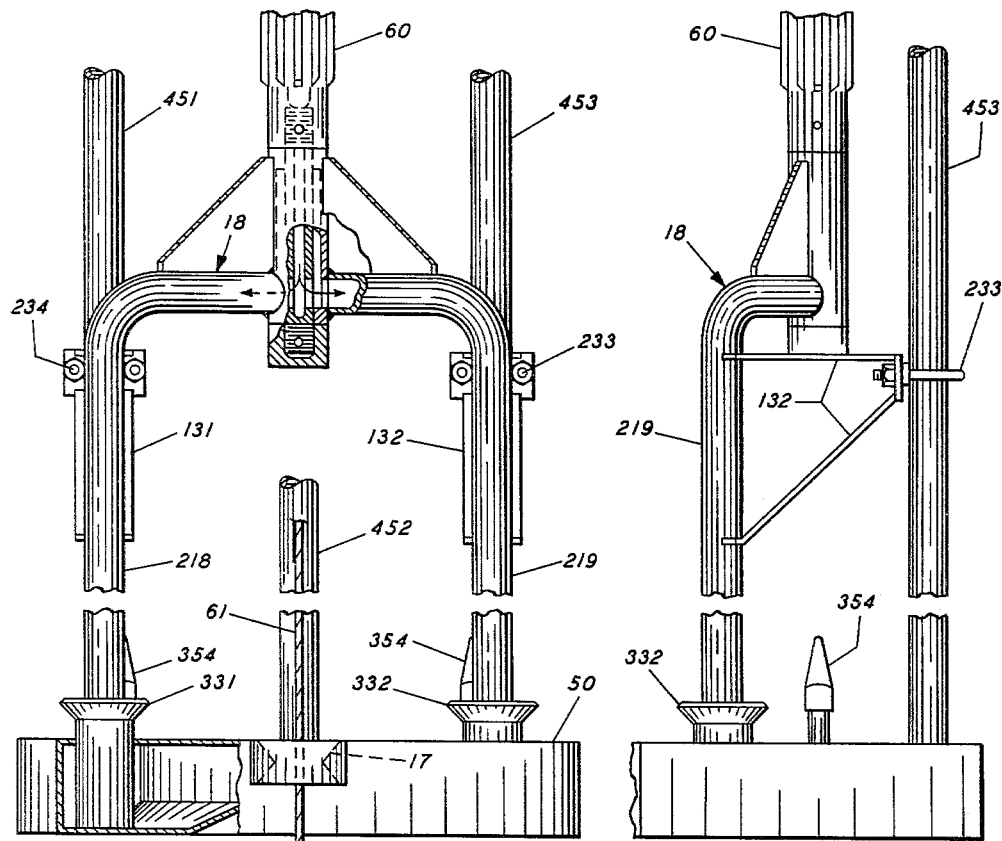
FIG. 21 is Section 21—21 of FIG. 19.
FIG. 22 is Section 22—22 of FIG. 19.
Figure 19:
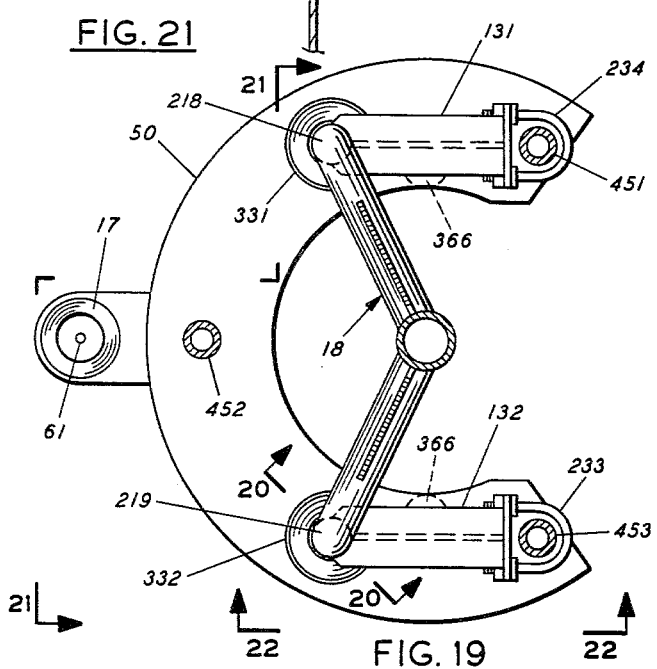
FIG. 19 is a top view illustrating a working base operably engaged by a fork member on a drill string.

Referring to the drawings and particularly to FIG. 1, there is illustrated an offshore drilling vessel, generally designated by the numeral 30, which has been anchored by lines 432 and 433 over a body of water 33 in approximate vertical relationship over the site where a well has been drilled in the underwater bottom 34. The drilling vessel 30 has an operational base which is generally indicated by numeral 300.

The operational base 300 of the vessel 30 is suitably maintained to run drill pipe and handle cables and to perform the other functions that are well known in the underwater drilling art. A permanent base 36 is located at a subsea well site and forms part of the fixed well site control apparatus. The permanent base has been secured to the well casing (not shown) which is cemented in the well bore. The upper end of the casing terminates in a fitting 38 which projects above the permanent base 36 and to which the wellhead control apparatus 40 is secured. Production lines 442 and control lines 443 are coupled to the well control apparatus 40 and extend to any suitable location. It has been assumed for ease in describing the present invention that the well has been drilled and completed to a stage where it has the wellhead control apparatus in place and is ready to or has been produced. The invention, however, is not limited to use in a well completed to this stage. For the purpose of this invention it is only necessary that a permanent base is fixedly positioned at a subsea location.

A pilot post 44 is fixedly connected to permanent base 36 by suitable means. A working base 50, including at least a pair of guide posts 452 and 453 fixedly mounted thereon, is disconnectably connected to the permanent base 36. The guide posts 452 and 453 and the flexible guide lines 456 and 455 associated therewith extend between the working base 50 at the subsea well site and the operational base 300 of the drilling vessel 30. Means for taking up and letting out the flexible guide lines are provided on the operational base 300. A secondary pilot post element 54 is connected to permanent base 36 to aid in aligning the working base 50 when it is moved into position over permanent base 36.

Again referring to FIG. 1, the flexible guide lines 456 and 455 are fixedly connected to the guide posts 452 and 453 which in turn are fixedly connected to working base 50. A guide line, for example guide line 456, which is connected to a guide post, for example guide post 452 extends between the guide post and the drilling vessel 30. Any suitable operable connection for the guide lines is provided on the operational base 300 of vessel 30. It is noted that the present invention is not limited to any particular number of guide posts and associated guide lines. Any number of guide posts and guide lines deemed operationally desirable may be used in accordance with this invention. A guide arm member 57 is slidably engaged on the guide lines 455 and 456.

The guide arm member 57 is connected to a drill string 59 by a suitable connecting member such as a bumper sub 60. The drill string 59 serves to move the guide arm member 57 slidably along the guide lines 455 and 456 between the drilling vessel 30 and the working base 50. The guide arm member 57 releasably holds pilot line 61 and coupling member 62 by means of friction sleeve 311. The guide arm member 57 acting in co-operation with the guide lines 455 and 456 guides the coupling member 62 to pilot post 44. The guide arm member 57 also carries television camera 63 and suitable lighting equipment for underwater observation. A cable 310 provides for electrical contact between the television camera 63 and associated equipment and the operational base 300 of the floating vessel 30.

The position of the apparatus as illustrated in FIG. 1 might occur after the completion of some work at the well site, for example opening or closing a valve on wellhead control apparatus 40. After this operation has been completed and it is desired to disconnect the working base 50 from the well the pilot line 61 is guided to the pilot post 44 where it is disconnectably connected to the pilot post by coupling member 62. After the flexible pilot line 61 is connected to the pilot post 44 the working base 50 is disconnected from the permanent base 36 and the working base 50, including the guide posts 452 and 453 and the flexible guide lines 455 and 456 connected thereto, is removed from the permanent base 36 and, if desired, taken from the water to vessel 30. The flexible pilot line 61 is then the only connection between permanent base 36 and the operational base 300 of vessel 30. The flexible pilot line 61 is connected to a float or buoy and released from the vessel 30 to mark the location of the underwater well and to provide a flexible connecting element extending therefrom.

In FIG. 2, an enlarged view of a portion of the apparatus illustrated in FIG. 1, is shown. Guide arm member 57 is slidably mounted on flexible guide lines 455, 456 and 457 by suitable means such as U-bolts 100 and 101 and sleeve 102. A bracket 103 for the television camera and lights is also connected to the guide arm member 57. A cable 310 provides contact between the surface and the television camera and lights. The guide arm member 57 releasably secures coupling 62 and the attached flexible pilot element 61 by means of friction sleeve 311. Friction sleeve 311 is prepositioned on the guide arm member 57 to cause the coupling member 62 to contact the pilot post 44 as the guide arm member 57 is lowered along the guide lines 455, 456 and 457. The operation and use of guide arms and guide lines are well known to those skilled in the art and need not be exhaustively described herein. FIG. 3 which is section 3—3 of FIG. 2 clearly shows the interaction between the guide arm member 57, guide lines 455, 456 and 457 and the bumper sub 60 which serves to connect the drill string and the guide arm member.

In FIGS. 4, 5, 6, 7, and 8 an embodiment of apparatus for disconnectably connecting the pilot line 61 to the pilot post 44 is illustrated. FIG. 4 is a side elevation partially in section of a coupling member which is generally indicated by numeral 62 held in friction sleeve 311. Coupling member 62 is one means of disconnectably connecting the pilot line 61 to the pilot post 44. The pilot line, which may be, for example wire cable, is rotatively connected to coupling member 62. For example the pilot line 61 is fixedly secured in fitting 105. A ball 106 is connected to the other end of fitting 105. A ball and socket joint is provided for ball 106 by a socket formed by co-operation between female member 107 and male member 108. Male member 108 is fixedly attached to the piston member 71 of the coupling member 62.

The guide arm member 57 holds coupling member 62 in a releasable manner. For example, a friction sleeve indicated generally as 311 is fixedly attached to guide arm member 57 and is positioned slidably over the tubular member 66 of coupling 62. The cyclindrical body 65 of friction sleeve 311 has a shoulder 470 which engages the upper portion of the tubular member 66 to prevent the tubular member 66 from sliding through the friction sleeve 311 as it is lowered into the water. A spring loaded piston 68 forces tubular member 66 against the interior of the cylindrical body 65 of the friction sleeve 311 to give a frictional contact between the members to maintain them in a normally contacting position. The friction sleeve 311 may, however, be slidably removed from coupling member 62 in an upwardly direction.

To further describe the co-operation between coupling member 62 and pilot post 44 to disconnectably connect th pilot line 61 and the pilot post 44, particular reference is now made to FIG. 4 and FIG. 6. The operating chamber 70 of coupling member 62 is fixedly mounted on tubular body member 66 and a portion of the operating chamber 70 extends interiorly of the tubular body member 66. The outside dimension of the operating chamber 70 is sufficiently less than the inside dimension of tubular body member 66 so as to provide an annular space between the two as indicated by numeral 471. The annular space or annulus is adapted to receive the end 76 of the pilot post 44. A piston member 71 is slidably positioned in the operating chamber 70 for limited reciprocating motion therein. A spring 72 is positioned in compression below the piston member 71 to urge it in an upward direction. Initially, the piston member 71 is forced down on the spring 72 and is releasably held in this position by shear pin 73 which extends through the piston member 71 and is secured to the operating chamber 70. The piston member 71 is provided with an annular groove 320. The groove 320 is provided with cammed walls and is deep enough to accommodate a number of spaced apart balls 74 in a recessed position in the ports 75 in the walls of the operating chamber 70 as shown in FIG. 4.

The coupling member 62 is positioned on the end 76 of the pilot post 44 by guide arm member 57 slidably moving on guide lines 455, 456 and 457 and by the use of the television camero 63 if necessary. The flared end 321 of friction sleeve 311 aids in engaging the end 76 of the pilot post 44. The end 76 of the pilot post 44 is slidably received into the annular chamber between the tubular body member 66 and the operating chamber 70 of coupling member 62. When the coupling member 62 is thus seated on the pilot post 44 shear pin 73 is broken by suitable means such as by simultaneously pulling up on pilot line 61 and holding down on guide arm member 57. The now freed piston member 71 moves upwardly and forces the balls 74 to extend out of ports 75.

With reference of FIG. 6 the end 76 of the pilot post 44 is provided with an annular interior groove 77 for receiving the extended balls 74. As the piston member 71 moves up in the operating chamber 70 the cammed walls of piston member 71 forces the balls 74 to extend out beyond the operating chamber through ports 75. Ports 75 are formed to allow a portion of the balls to extend through the ports 75 but not to allow the balls 74 to escape out of the operating chamber 70. The balls 74 are forced out and are received in the groove 77 formed in the interior of the end 76 of the pilot post 44 to thus provide a connection between coupling member 62 and pilot post 44. The friction sleeve 311 fixedly connected to guide arm member 57 is then slidably removed over coupling member 62 by pulling up guide arm member 57 along the guide lines 455, 456 and 457.

With reference now to FIG. 7 one means for disconnecting coupling member 62 from pilot post 44 is illustrated. A striking bar 80 having a hollow interior adapted to slide along pilot line 61 and to strike the coupling member 62 in the position illustrated in FIG. 7 is dropped from the surface. FIG. 7 illustrates the interaction between the striking bar 80 and the coupling member 62 just as the impact between the two has occurred. Striking bar 80 is provided with a plurality of springable latch members, for example latch members 481 and 482 which normally are located in grooves 322 and 323 on the exterior surface of striking bar 80. The latch members 481 and 482 have fingers 324 and 325 for engaging a flange 326 on the operating chamber 70. When the striking bar strikes coupling member 62 the impact causes the piston member 71 of coupling member 62 to move forceably in a downwardly direction and to compress spring 72. The groove 320 in piston member 71 comes alongside balls 74 and the balls 74 retreat into the groove 320. The fingers 324 and 325 of latch members 481 and 482 engage the flange 326 on the operating chamber 70 and the piston member 71 is captured in the down position. Since the balls 74 are recessed in groove 320 the coupling member 62 is disconnected and can be removed from the pilot post 44.

In FIGS. 9, 10, 11, 12 and 13 an alternative embodiment of apparatus for disconnectably connecting the pilot line 61 to the pilot post 44 is illustrated. In this embodiment a drill string acting through bumper sub 60 and guide arm member 91 is used to supply rotational motion to couple and uncouple the coupling member from the pilot post. With particular reference to FIG. 9 the pilot post 44 is provided with an end 340 having male threads 341. A disconnectable coupling member represented generally by the numeral 92 is positioned over the end 340 of the pilot post 44 by means of a guide arm member 91 traveling on the guide lines. The guide arm member 91 may also carry a television set and lights (not shown) to allow visual inspection of the positioning of coupling member 92 on pilot post 44. The coupling member 92 has a cap member 342 containing mating threads for the male threaded end 340 of the pilot post 44. The coupling member 92 is disconnectably connected on the bumper sub 60 of the drill string by a friction sleeve 110 arranged as described heretofore. A prong member 95 is pivotally connected by pins 495 to the cap member 342. The pilot line 61 is connected by suitable means to the free end of the prong member 95. For example, connecting means 290 and 291 form a suitable connection for pilot line 61 to prong member 95. When the pilot line 61 is connected to the coupling member 92 in the above manner the pilot line 61 can move eccentrically with the drill string 59 into the water. A bracket 111 fixedly mounted on the guide arm member 91 holds a pair of poles 212 and 213 in position to engage prong member 95 and to thus prevent the frictionally held coupling member 92 from rotating with the drill string while cap member 342 is screwed onto the threaded end 340 of the pilot post 44. FIG. 11 illustrates in phantom the interaction between the prong member 95 and the poles 212 and 213.

To connect the pilot post 44 and the pilot line 61 the coupling member 92 is positioned on the end 340 of the pilot post 44. The drill string is rotated and the rotational motion is transmitted by the bumper sub 60 and through the guide arm member 91 by a rotatable drive link carried interiorly of sleeve 229 to friction sleeve 110 to cause the threaded portions of the coupling member 92 and the pilot post 44 to mate. After the connection is made the drill string and bumper sub 60 and guide arm member 91 are pulled free. The pilot line 61 may be pulled to move prong member 95 to an upright position as is illustrated in FIG. 12. FIG. 13 is a view partially in section clearly showing the interaction between the coupling member 92 and the threaded end 340 of the pilot post 44 when the two are connected together. The pilot line is disconnected from the pilot post 44 by making use of the drill string to unscrew coupling member 92 from pilot post 44. The use of the drill string as an underwater tool to perform operations such as described above is fully disclosed in my copending application Serial Number 235,433.

In FIG. 14 an underwater well site is shown and is indicated generally by the numeral 34. A permanent base 36 is included on the well site. The permanent base 36 has a collar 31 fixedly connected thereto. The collar 31 has a flange 39. Well control apparatus indicated generally by the number 40 is operably positioned on permanent base 36. Control and production lines 442 and 443 are operably connected to well control apparatus 40. Pilot post 44 is fixedly attached to base 36. A supplementary pilot post 54 is also attached to base 36. A flexible pilot line 61 is disconnectably connected to the pilot post 44 by a coupling member 62. A float member 19 is connected to the other end of pilot line 61 to maintain the pilot line 61 in a position where it is easily accessible from the operational base of a floating vessel.

A particular feature of this invention includes the ability to remove the guide posts and the guide lines associated therewith from a well and to leave the well with only a single pilot line communicating with the surface. Thus, the well may be put on production or from some other reason temporarily removed from actual contact with the drilling vessel without leaving a large amount of equipment including guide posts and guide lines attached to the well. Yet the guide posts and guide lines may be reattached easily at some later time. It is in accordance with the present invention to provide the underwater well site with a permanent base and to establish a flexible pilot line extending between a pilot post on said base and a floating buoy on the water's surface. When it is desired to establish guide lines and guide posts communicating between a surface vessel and the well site a vessel is floated over the site and the pilot line is captured from the water and operably secured on the operational base of the vessel. A working base including at least a pair of fixedly spaced apart guide posts thereon and the guide lines attached to said posts is guided along the pilot line to the subsea permanent base. The working base is then aligned to a predetermined alignment and seated on the permanent base and disconnectably connected thereto. The pilot line may then be removed from the water for examination, etc. Replacement of the pilot line is accomplished prior to removing the working base and guide lines. By the interplay between the pilot line on one hand and the working base and guide posts and guide lines on the other it is possible to leave the well with only a minimum of equipment on it but to return and easily provide the equipment for operating the well.

In accordance with the invention a well site including a permanent base 36 and a pilot post 44 having a pilot line 61 attached thereto and floated by appropriate means 19 at a surface or near surface location can be left unattended. When for some reason it is desired to do some work on the well, for example, to adjust the production valves, a vessel having an operations base picks up the pilot line from the water and orients itself in approximate vertical relationship to the underwater well site. A working base including at least a pair of guide lines attached thereto is lowered into the water and guided along the pilot line to a position immediately above permanent base 36 and in slidable and pivotal contact with the pilot post 44. The working base 50 is aligned with the permanent base 36 and seated thereupon. The working base 50 is disconnectably connected to the permanent base 36. The pilot line 61 may be then removed for inspection or to clear the area around the well so as not to interfere with workover operations. When operations are completed the pilot line 61 is replaced and the working base 50 removed to thus leave a minimum amount of equipment at the underwater well site.

With respect now to FIGS. 15, 16, and 17 a method and means for aligning a working base 50 to a predetermined alignment and for seating the working base 50 on a permanent base 36 is illustrated. FIG. 15 is a side elevation and FIG. 16 is a plan view of how a working base 50 might, for example, initially contact pilot post 44. The working base is slidably connected to the pilot line 61 and is guided from the operational base of the floating vessel to the underwater well site by the pilot line 61. When the base 50 reaches the level of the pilot post 44 it slides onto the pilot post 44 and slidably and pivotally engages the pilot post. The working base 50 is preferably disconnectably attached to a drill string 59 by suitable means such as a bumper sub 60 and a fork member 18 attached thereto and lowered into the water on the drill string so that the weight of the working base 50 is carried on the drill string and not by the guide lines 455, 456, and 457. The drill string is also useful to align the working base to predetermined alignment. The bumper sub 60 serves to connect the end of the drill string to the fork member. As is well known in the art a bumper sub is a connecting means useful in damping motion along a drill string.

A fork member 18 is fixedly connected to the drill string 59 by the bumper sub 60 to rotate with the drill string. The fork member 18 comprises at least a pair of prongs 218 and 219 for disconnectably connecting the working base 50 to the drill string as will be more fully described herein. The working base 50 must be aligned to clear any protruding wellhead apparatus such as, for example, the production and control lines 442 and 443. The working base is, therefore, constructed generally in the shape of a horseshoe. The collar of the working base 50 is adapted to pass over the flange 39 of the collar 31 which is fixedly connected to the working base. The working base 50 is constructed so as to fit loosely around collar 31 and over flange 39.

Once the working base reaches the position as shown in FIG. 15 where it is slidably and pivotally engaged on pilot post 44 the drill string 59 is torqued to pivot the working base to a predetermined position as illustrated in phantom in FIG. 15. In this position the working base 50 is aligned over the permanent base 36. Supplementary pilot posts 54 and 17 may be made available on permanent base 36 to assist in aligning the working base 50. After the working base 50 has been aligned to the predetermined position as illustrated in FIG. 17 the working base 50 is lowered and seated on the permanent base 36. The working base 50 is then disconnectably connected to the permanent base 36 as will be more fully described herein, and the fork member 18 is caused to release the working base 50. The drill string 59 and the fork member 18 connected thereto may be removed from the working base 50 and taken out of the water as is illustrated in FIG. 18.

With particular reference to FIGS. 19, 20, 21 and 22 means for guiding the working base to the subsea well site and for positioning the working base on the permanent base will be more fully described. The working base 50 is provided with a means 17 for slidably and pivotally engaging the pilot line and the pilot post. The pilot line engaging means 17 is preferably a sleeve with a bushing which will loosely receive the pilot post 44.

A fork member generally designated by the number 18 is fixedly connected to the drill string by a suitable means such as bumper sub 60 and disconnectably connected to working base 50. It is preferred to use fork member 18 and the drill string to position the working base underwater because the weight of the working base is more easily borne by the drill string than it would be by the guide lines. The fork member includes at least a pair of spaced apart prong members 218 and 219 for releasably connecting the working base 50 to the drill string. The prong members 218 and 219 are hollow and are operably connected to a hydraulic system as shown in phantom in FIG. 21. The prong members 218 and 219 each carry a brace 131 and 132. The braces are fixedly mounted to the respective prong member. Each brace is provided with a means such as U-bolts 233 and 234 for slidably connecting the braces with the guide posts 451 and 453. The braces aid in releasably securing the working base 50 to the drill string.

Figure 20:
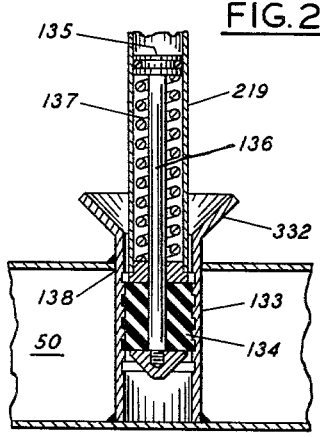
FIG. 20 is Section 20—20 of FIG. 19.

FIG. 20 illustrates one means for disconnectably connecting the prong members 218 and 219 of the fork member 18 to the working base 50. Working base 50 is provided with wells 138 for receiving each of the prong members 218 and 219. The wells are provided with a receiving member 133 for receiving a deformable packer 134 fixedly attached to each of the prong members 218 and 219. Flared fittings 331 and 332 aid in guiding the prong members into the wells 138. The deformable packer 134 is located near the end of the prong members. A piston 135 having a piston rod 136 normally extended by spring 137 normally causes the packer 134 to remain in an expanded position. However, when the piston 135 is forced in a downwardly direction the piston rod 136 releases the packer 134 and allows it to contact from the walls of receiving member 133. One means of forcing the piston down includes the use of a hydraulic fluid under pressure forced down the drill string and through the bumper sub from the surface and directed through the passageways provided in the fork member 18 to the piston 135. The expanded packer 134 provides a suitable disconnectable connection between the fork member 18 and the working base 50.

When the working base 50 is in the desired position at sea bottom the pressure on the hydraulic system is applied and the spring 137 overcome so the piston 135 and piston rod 136 move down and the packer 134 is contracted. The prong members 218 and 219 are then removable from the receiving member 133. The working base 50 is now positioned in contact with the permanent base 36 using the methods described heretofore, and the fork member 18 is removed from the working base 50. All that remains to put the working base 50 in readiness for operation is to disconnectably connect the working base 50 to the permanent base 36.

Referring now to FIGS. 23, 24, 25, 26, 27, and 28 an embodiment of apparatus for disconnectably connecting the working base 50, including the guide posts 451, 452 and 453 and guide lines associated therewith, to the permanent base 36 of a subsea well is illustrated. FIG. 23 is a side elevation and FIG. 24 is a plan view of the working base 50 seated in position on permanent base 36. The working base 50 has been lowered into the water and guided to its present position by the methods heretofore described. In accordance with this embodiment of the invention, the drill string is utilized to conduct a hydraulic fluid under pressure to a hydraulic system located in the working base 50. The drill string is operably connected to the hydraulic system in working base 50 through bumper sub 60 and nozzle 170. The nozzle 170 is operably positioned in port 151 of working base 50 by means of an appropriately formed guide arm member 501. For example, the guide arm member 501 secures the nozzle in a predetermined position with respect to the guide posts 451 and 452 and is then lowered with the nozzle 170 and the drill string and is guided along the guide lines. The guide arm member slidably engages the guide posts 451 and 452 by appropriate means such as U-bolt 503 and sleeve 502. The guide arm member 501 is then lowered along the guide posts, and the nozzle 170 penetrates into port 151.

The working base 50 is provided with hydraulic conduits and hydraulic motors to disconnectably connect the working base 50 to the permanent base 36. The hydraulic conduits of the working base 50 are operably connected with a source of hydraulic fluid. For example, the drill string is a means of supplying a hydraulic fluid to the working base. Clearly illustrated in FIGS. 26 and 27, where portions of the exterior of the working base 50 have been cut away to more clearly show the working of the hydraulic system, are a pair of fixedly mounted hydraulic motors 140 and 141. The motors 140 and 141 extend and retract latch members 143 and 144 under the edge 374 of the flange 39 on permanent base 36. The latch members 143 and 144, when extended disconnectably connect the working base 50 securely on the permanent base 36.

The latch members 143 and 144 are extended by moving the hydraulic fluid into the hydraulic system in working base 50 through port 151. The latch members 143 and 144 are retracted by forcing the hydraulic fluid into the hydraulic system in working base 50 through port 150. For example, when it is desired to extend the latch member 143 and 144 to disconnectable connect the working base 50 to the permanent base 36 a hydraulic fluid is directed into the hydraulic system through port 151 into chamber 162 formed in working base 50. The fluid is caused to flow into a conduit 160 leading out of the chamber 162. Conduit 160 opens into conduit 163 at junction 156 and fluid is caused to flow in both directions in conduit 163 and into the hydraulic motors 141 and 140 to operate the motors and extend latch members 143 and 144. The hydraulic fluid is exhausted from the hydraulic motors 140 and 141 into conduit 165. Conduit 165 opens into conduit 155 at junction 154 which is vented through port 150. When it is desired to retract the latch members 143 and 144 the hydraulic fluid is caused to enter the hydraulic system through port 150 and to thus flow into the opposite direction through the system causing the motors to retract the latch members.

The hydraulic fluid is supplied to the hydraulic system in working base 50 by any suitable means. One suitable means includes connecting the drill string to the working base through port 151 or port 150 to serve a conduit for hydraulic fluid from the surface. A suitable means for connecting the drill string to serve as a conduit for transporting hydraulic fluid to the hydraulic system is illustrated in FIG. 27 and FIG. 28. Since it is usually desirable to use a bumper sub when working with the drill string the bumper sub 60 is provided with a fluid tight connection to the drill string. The bumper sub 60 is provided with a nozzle 170 for entering port 151 or port 150. The nozzle is provided with a bayonet type latch 171 for engaging the fixedly mounted post 172 in the chamber 173 or a similar post which is located in chamber 162. A fluid seal member 174 is arranged to prevent fluid loss past nozzle 170 and out of the chamber 162 or 173 when the nozzle 170 is inserted. Thus, the only exit for fluid from the chamber 162 when the nozzle is inserted therein is through conduit 160 and thence into the hydraulic system. FIG. 28 illustrates the nozzle 170 in greater detail. A spring 176 and piston member 177 are springably connected to releasably capture post 172 when the nozzle 170 is connected in operable position in chamber 162 or 173. In this manner the nozzle 170 is held securely in chamber 162 or 173 while the hydraulic fluid is forced into the hydraulic system in the working base 50.

As shown in FIG. 30, which illustrates the base portion of the apparatus, the permanent base 36 has a cylindrical collar 31 extending vertically above it to the top of which a radially extending flange 39 is affixed in a unitary manner. The working base 50 is made in plan view in the form of a ring which fits loosely around the periphery of the flange 39 and carries a means for detachably interlocking it with the flange 39.

The working base portion 50 has a segment removed from one side of it, in the region indicated by numeral 352, FIG. 29, to provide clearance for portions of the submerged wellhead apparatus, such as, for example, the production and control lines 442 and 443, which remain attached to the well when the removable working base 50 is lifted from the fixed base 36 on the wellhead apparatus. This horseshoe form of the working base 50 also enables the guide lines to be lowered and reattached to the submerged wellhead if at some later time the well is to be worked on.

FIGS. 29 to 31 illustrate an alternative means for disconnectably securing the working base 50 to the permanent base portion 36. A plurality of actuator elements, illustrated by the actuator element 354 are rotatably mounted in the working base portion 50 in bearings 356 and 358 and positioned radially outwardly from the inner circumferential edge 360 of this base portion. The shaft 362 of the actuator element is screw-threaded as at 364 in the region between its bearing supports and carries a lug 366 which has complementary screw threads mating with the screw threads 364 of the actuator element. Thus, as the actuator element is rotated, the lug 366 will move upwardly or downwardly on the shaft thereof. The mating screw threads between the lug 366 and the actuator element 354 engage with enough friction so that when the actuator element is rotated, and provided the lug is not against an abutment, the lug will be carried around in rotation with the shaft.

When the actuator element is rotated in a counterclockwise direction as viewed in FIG. 29, the lug 366 meets an abutment 368 recessed in the base portion 50 which holds the lug relatively stationary in rotation while it is screwed downwardly relative to the shaft of the actuator element. When the actuator element is screwed in a clockwise direction as viewed in FIG. 29, the lug is rotated into a contact with an abutment 370 formed in the peripheral wall 372 of the base portion 50, at which time the lug extends from the wall of the working base radially inwardly toward the center of the wellhead apparatus and projects under the collar 39 of the permanent base section. Continued rotation of the actuator element in a clockwise direction causes the lug to move upwardly relative to the shaft of the actuator element and finally to engage the lower surface 374 of the collar thereby securing the removable working base portion 50 to the permanent fixed base portion 36.

To disconnect the removable working base portion 50 from interlocking relationship with the fixed wellhead apparatus, the actuator element 354 is rotated in a counterclockwise direction to move the lug 366 downwardly relative to the actuator shaft so that it becomes disengaged from its contact with the lower surface 374 of the collar 39 and subsequently moves in rotation with the rotating element until it comes against the abutment 368 at which time it is buried within a recess in the removable base portion and is entirely clear from interfering with the removal of this base portion from the fixed permanent base portion 36.

In disconnecting and connecting the auxiliary working base portion 50 from and to the permanent base 36, by means of the lugs described herein, the drill string is lowered from the vessel and guided by the particularly constructed transverse rigid guide member 375 to engagement with the actuator unit 354. The guide member 375 is guided along the guide lines and guide posts in the manner heretofore described. Depending on whether it is desired to connect or disconnect the base member, the top of the string of drill pipe is turned at the vessel to turn the actuator unit in the proper direction to clear the lug 366 from engagement or to cause the lug to engage with the collar 39 as described heretofore. This is done for each of the lugs in turn, in each case a transverse guide member being used which is particularly constructed to seat the operator element 377 on the selected actuating unit.

As is fully described in my copending U.S. application Serial Number 235,433 filed on November 5, 1962 the drill string is used to rotate the actuator elements to connect and disconnect the base portions as described above. With particular reference to FIGS. 30 and 31 a means for transferring the rotational movement of the drill string and the bumper sub 60 connected for rotation therewith through the guide arm member 375 to the actuator elements, such as actuator element 354, is illustrated. A rotatable element 386 is journaled in a bearing 388 for rotation about its vertical axis and means are provided for connecting the lower end of the bumper sub 60 to the upper end of the rotatable element, as for example, a screw-threaded connection. An operator element 377, seatable loosely over an actuator 354, is fixedly connected to the lower end of rotatable element 386 by suitable means such as set screw 390. The operator element 377 transfers the rotational movement to the actuator from the drill string and the bumper sub 60.

It is apparent that modifications other than those described herein may be made to the apparatus of this invention without departing from the inventive concept. It is intended that the invention embrace all equivalents within the scope of the appended claims.

I claim:

1. Apparatus for use at a site under a body of water comprising a permanent base member fixedly mounted under a body of water, said permanent base member including a portion for seating a working base, a collar having a radially extending flange fixedly mounted on said permanent base, a working base member for seating on said permanent base, guidepost means fixedly connected on said working base and extending in perpendicular relationship therefrom, lug means connected on said working base for engaging the undersurface of said flange, actuating means in said working base for extending and retracting said lug means to selectively engage and disengage said flange, surface-controlled operating means for operating said actuating means, a pilot post fixedly connected to said permanent base and extending in a substantially perpendicular relationship therefrom and a pilot line connected to the top of said pilot post, said pilot line being engageable with said working base to assist in guiding said working base into contact with said pilot post and onto said permanent base.

2. The apparatus of claim 1 where the actuating means for extending and retracting said lug means are operably connected hydraulically operated motors.

3. The apparatus of claim 1 wherein the actuating means for extending and retracting said lug means are mechanically operated.

4. The apparatus of claim 1 where the flexible pilot line is disconnectably connected to said pilot post of said permanent base member.

5. Apparatus for use at a site under a body of water comprising a permanent base member fixedly mounted under a body of water, said permanent base member including a portion for seating a working base, engageable means on said permanent base member, a working base member for seating on said permanent base member, guidepost means fixedly mounted on said working base member, said guidepost means being fixedly spaced apart on said working base and extending in perpendicular relationship therefrom, engaging means on said working base member for cooperation with the engageable means on said permanent base member for disconnectably connecting said permanent base member and said working base member, a pilot post on said permanent base, a flexible pilot line extendable from said pilot post to the surface of said body of water and contactable with said working base for guiding said working base member into contact with said pilot post, at least one supplementary pilot post on said permanent base member for use in aligning said working base member in a predetermined position on said permanent base member and actuating means for actuating said engaging means to disconnectably connect said working base member and said permanent base member.

6. The apparatus of claim 5 further characterized in that the working base member is horseshoe shaped.

7. Apparatus for underwater well working comprising a permanent base fixedly located under water, a floating vessel positioned in substantially vertical relationship to said permanent base, a pilot post vertically extending from said permanent base, a flexible element extending from said pilot post of said permanent base to said floating vessel, a working base, guidepost means fixedly connected to said working base and extending in perpendicular relationship therefrom, means on said working base for slidably engaging said flexible element, at least a pair of flexible guidelines having one end operably attached to the guidepost means of said working base and the other end operably connected to said floating vessel, said guidelines being extendable between said working base and said floating vessel, means for lowering said working base including the guidelines attached thereto into the water from said floating vessel along said flexible element to a position contacting said pilot post of said permanent base, at least one supplementary pilot post extending from said permanent base and contactable with said working base to assist in aligning said working base in position over said permanent base and means for disconnectably connecting said working base to said permanent base.

8. The apparatus of claim 7 further characterized by means for disconnectably connecting said flexible element to the pilot post of said permanent base.

References Cited by the Examiner

UNITED STATES PATENTS

| | | | |
|---|---|---|---|
| 2,917,281 | 12/1959 | Kofahl | 175—7 |
| 2,923,531 | 2/1960 | Bauer et al. | 175—7 |
| 2,962,096 | 11/1960 | Knox | 166—75 |
| 3,012,610 | 12/1961 | Bauer et al. | 175—7 |
| 3,021,909 | 2/1962 | Postlewaite | 175—7 |
| 3,028,915 | 4/1962 | Jennings | 166—46 |
| 3,032,106 | 5/1962 | Focht et al. | 166—46 |
| 3,050,140 | 8/1962 | Hayes | 166—66.5 X |
| 3,062,287 | 11/1962 | Hayes | 166—66.5 |
| 3,071,188 | 1/1963 | Raulins | 166—66.5 |
| 3,080,921 | 3/1963 | Lacy | 166—66.5 |
| 3,099,316 | 7/1963 | Johnson | 166—66.5 X |

FOREIGN PATENTS 814,520  6/1959  Great Britain.

JACOB L. NACKENOFF, *Primary Examiner.*

CHARLES E. O'CONNELL, *Examiner.*